United States Patent [19]

Benqué et al.

[11] 4,043,867
[45] Aug. 23, 1977

[54] STRUCTURE FOR REDUCING CONVECTION CURRENTS WITHIN THE PRESSURE VESSEL OF A FAST REACTOR

[75] Inventors: Jean-Pierre Benqué, Paris; Jean Lallement, Verrieres-le-Buisson; Paul Lambert, Echirolles, all of France

[73] Assignee: Commissariat a l'Energie Atomique, Paris, France

[21] Appl. No.: 608,611

[22] Filed: Aug. 28, 1975

[30] Foreign Application Priority Data

Sept. 3, 1974  France .................. 74.29932

[51] Int. Cl.² ............................. G21C 15/20
[52] U.S. Cl. ..................... 176/40; 176/62; 176/65; 176/87
[58] Field of Search ........... 176/40, 50, 61, 62, 176/63, 64, 65, 87, 85

[56] References Cited

U.S. PATENT DOCUMENTS

| 3,215,608 | 11/1965 | Guenther | 176/87 |
|---|---|---|---|
| 3,275,521 | 9/1966 | Schluderberg et al. | 176/87 |
| 3,356,589 | 12/1967 | Grell et al. | 176/87 |
| 3,489,206 | 1/1970 | Lecourt | 176/87 |
| 3,607,637 | 9/1971 | Marshall | 176/59 |
| 3,715,270 | 2/1973 | Jackson | 176/40 |
| 3,785,924 | 1/1974 | Notari | 176/87 |
| 3,821,079 | 6/1974 | Jabsew | 176/61 |
| 3,823,066 | 7/1974 | Thome | 176/50 |
| 3,850,795 | 11/1974 | Thome | 176/87 |

*Primary Examiner*—Samuel W. Engle
*Assistant Examiner*—S. A. Canglalosi
*Attorney, Agent, or Firm*—Sughrue, Rothwell, Mion, Zinn and Macpeak

[57] ABSTRACT

A hollow metallic ring structure is secured to the periphery of the diagrid support and located within an internal annular space formed between the lateral neutron shield of the reactor core and an inner tank placed within a primary vessel. The ring structure is smaller in width than the annular space, has a maximum height equal to that of the reactor core, and is provided with partition-walls and holes for producing pressure drops and reducing convection currents.

5 Claims, 2 Drawing Figures

STRUCTURE FOR REDUCING CONVECTION CURRENTS WITHIN THE PRESSURE VESSEL OF A FAST REACTOR

This invention relates to a structure for reducing convection currents within the pressure vessel of a nuclear reactor.

In more precise terms, the present invention is concerned with special structures which are placed within the primary vessel of a liquid sodium cooled fast reactor with a view to reducing the convection currents of the hot primary sodium in the vicinity of the reactor core. The chief aim of such structures is to prevent the core support structures from being heated by any part of the hot primary sodium as this latter leaves the top portion of the reactor core.

Figure 1:
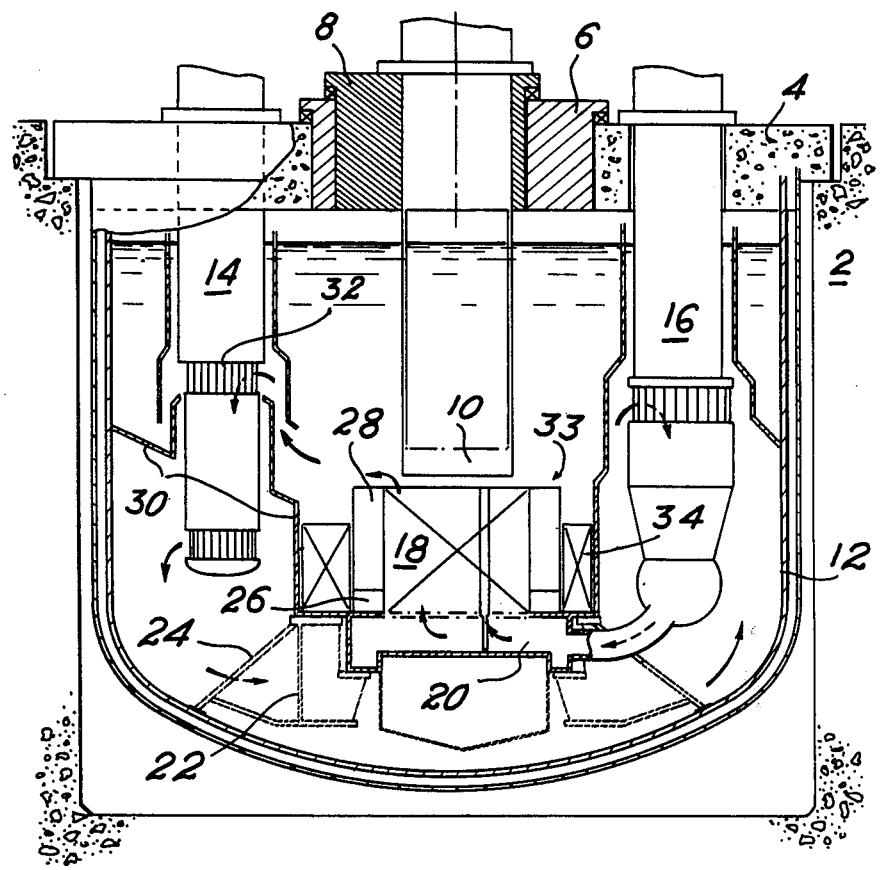

A clearer understanding of the problem to be solved will be gained by referring to the schematic view of FIG. 1 in which the pressure vessel of a liquid sodium cooled fast reactor is illustrated in sectional elevation. This figure shows the concrete reactor vault 2 which is closed at the top by the vault roof 4 in which are rotatably mounted the large rotating shield plug 6 and the small rotating shield plug 8 which supports the core lid 10. The sodium is contained in the primary vessel 12 which is suspended from the concrete vault roof 4.

There is also shown in the figure a primary heat exchanger 14 which permits heat exchange between the primary sodium circulating within the vessel 12 and the secondary sodium as well as a primary pump 16 which reinjects into the reactor core the exit primary sodium from the heat exchangers 14. The reactors core 18 is supported by the diagrid 20 and this latter in turn rests on a support structure 22 which is rigidly fixed to the primary vessel 12 by means of the frusto-conical shell 24.

The false diagrid 26 has the shape of a ring which surrounds the bottom portion of the reactor core. Said false diagrid rests on the diagrid 20 at the periphery of this latter and serves to support the lateral neutron shield 28. In order to separate the hot primary sodium from the cold primary sodium, the primary vessel 12 is provided with an inner primary tank 30. In broad outline, the primary sodium circuit is as follows: the hot sodium is discharged from the top portion of the reactor core 18 and directed towards the inlets 32 of the heat exchangers 14 by means of the reactor core lid 10. At the exit of the heat exchangers, the cold primary sodium is recirculated by the primary pumps 16 which reinject the cold primary sodium into the diagrid 20 and therefore into the lower end of the reactor core 18.

A small portion of the cold primary sodium serves to cool the false diagrid 26 and the lateral neutron shield 28.

In actual fact, the circulation of the exit hot sodium from the reactor core is more complex than has been mentioned in the foregoing. In particular, by reason of the design structure of the reactor, provision is made for an annular space 33 between the inner primary tank 30 and the lateral neutron shield 28. Said annular space 33 is relatively large in the case of high-power reactors (for example reactors having an electrical output of more than 1000 MW). Moreover, by reason of the presence of the heat exchangers, of the pumps and in particular of the transfer flask, the annular space 33 does not have a constant width as is apparent from FIG. 1. In other words, the space occupied by the assembly consisting of the reactor core 18 and the lateral neutron shields 28 is displaced off-center with respect to the inner primary tank 30.

This arrangement sets up convection currents of hot sodium towards the lower portion of the annular space 34. This has the effect of heating the diagrid 20 and especially the false diagrid 26 as well as the diagrid support structure 22. Moreover, by reason of the variation in width of the annular space 33, convection currents of hot sodium are also present in a horizontal plane. This accordingly gives rise to convection currents which "rotate" about the assembly constituted by the reactor core 18 and the lateral neutron shields 28.

The precise aim of the present invention is to provide a structure for reducing convection currents within the pressure vessel of a reactor which makes it possible to prevent or at least to reduce these convection currents to a considerable extent, thus preventing heat build-up of the false diagrid and of the diagrid support structure. This also permits enhanced recovery of the heat energy contained in the hot sodium.

The structure for reducing convection currents is essentially constituted by a hollow metallic ring which is secured at the lower end to the periphery of the support structure and located within said annular space, the walls of said ring being provided with holes, the width of said ring being smaller than the width of said annular space and the height of said ring being equal at a maximum to the height of the reactor core.

Provision is preferably made between said structure and the inner primary tank and between said structure and the external wall of the reactor core for two gaps whose width is smaller than one-twentieth of the height of said structure.

In accordance with a further characteristic feature, the hollow ring is provided internally with at least one horizontal partition-wall pierced with holes.

Finally, the hollow ring can be provided internally with vertical partitions disposed in diametral planes of said ring.

Figure 2:
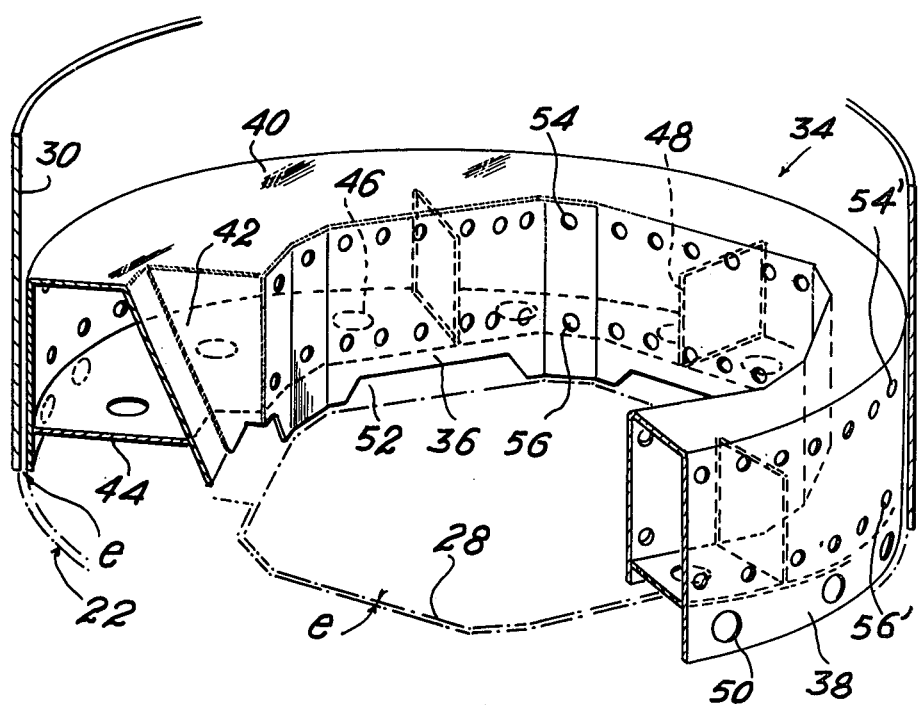

A more complete understanding of the invention will in any case be obtained from the following description of one embodiment of the invention which is given by way of example and not in any limiting sense, reference being had to the accompanying drawings, wherein:

FIG. 1 is a sectional view in elevation showing the reactor vessel, this view having already been partly described, and FIG. 2 is a part-sectional view in persepctive showing the structure for the reduction of convection currents.

The structure which is designated by the reference 34 has the shape of a hollow ring surrounding the lateral neutron shield 28 of the reactor core, said ring being placed between said lateral shield and the inner primary tank 30. Said structure is fixed on the diagrid support 22 at the level of the top portion of the diagrid. The structure 34 has two lateral surfaces. The inner lateral surface 36 has the shape of a prismatic surface having a hexagonal cross-section which corresponds exactly to the external contour of the lateral shield 28. The outer lateral wall 38 has the shape of a cylindrical surface having a circular transverse cross-section which closely conforms to the shape of the inner primary tank 30. Said walls are preferably formed of sheet metal plates. The lateral surfaces 36 and 38 are welded at the lower ends to the top portion of the diagrid support 22. Said surfaces are welded at the lower ends to a horizontal plate 40 which closes the structure 34. As mentioned earlier, the reactor core is displaced off-center with respect to the inner primary tank 30. The lateral surface 38 is displaced off-center with respect to the lateral surface 36.

The ring constituting the structure 34 is provided with a recessed portion 42 corresponding to the lower portion of a handling flask for removing spent fuel assemblies from the reactor vessel. It is noted that provision is made for a gap having a width $e$ between the wall 38 and the inner primary tank 30 and for a gap having a width $e'$ between the lateral wall 36 and the outer face of the lateral neutron shield 28.

In order to reduce the effects of convection of the sodium within the structure 34, this latter is provided with partition-walls. Provision is first made for a horizontal internal partition-wall 44 which is welded to the lateral walls. Said horizontal partition-wall 44 is intended to limit turbulence and convection currents within the interior of the structure 34 and is pierced with orifices such as those designated by the reference 46.

The structure 34 is also provided with a plurality of vertical radial partitions as designated by the reference 48. These partitions are also intended to reduce the effects of convection of hot sodium within the interior of the structure 34. Holes formed in the lateral walls 36 and 38 provide communications through the structure 34 between the annular gaps having a width $e$ and $e'$. Provision is made in the first place for the series of holes 50 and cut-out portions 52 which form passageways beneath the horizontal partition-wall 44. Provision is made in the second place for two series of holes of smaller diameter such as the holes 54 and 56 on the inner lateral face 36 and the holes 54' and 56' on the outer lateral face. The intended function of these different holes is to produce pressure drops so as to reduce convection currents to an appreciable extent. There is thus obtained at the lower end of the structure 14 a cold zone which prevents any contact between the hot sodium and the false diagrid 26 as well as the diagrid support 22.

In one particular embodiment, the structure 34 has a height of the order of two meters whilst the total height of the reactor core above the diagrid is approximately 4.30 meters. The widths $e$ and $e'$ of the gaps formed respectively between the structure 34, the inner primary tank 30 and the lateral neutron shield 28 is of the order of 80 to 100 mm.

The widths $e$ and $e'$ are preferably smaller than one-twentieth of the height of the structure 34.

It is readily apparent that the design of the structure 34 could be slightly different without thereby departing from the scope of the invention. In particular, the height of the structure 34 could be increased to three meters. It is also self-evident that provision could be made for different partition-walls within the interior of the structure 34, the object of such partition-walls being always to produce pressure drops in order to reduce convection currents, whether such currents are upward, downward or circular.

What we claim is:

1. In a fast nuclear reactor of the type having a pressure vessel, a reactor core, support means for supporting the reactor core within the vessel, a liquid metal coolant and means for circulating the liquid metal coolant through the core, the improvement comprising an inner tank spaced from and surrounding said reactor core to define an annular space between said reactor core and said inner tank, heat exchanger means within said pressure vessel for receiving liquid metal coolant from said reactor core and discharging said liquid metal coolant into said inner tank, pump means within said pressure vessel for pumping said liquid metal coolant from said inner tank to said reactor core for circulation therethrough and a structure for reducing convection currents of said coolant within said pressure vessel comprising a hollow metallic ring supported by said support means and located within said annular space, said ring having walls provided with a plurality of holes with the width of said ring being smaller than the width of said annular space and the height of said ring being equal at a maximum to the height of said reactor core.

2. In a fast nuclear reactor as set forth in claim 1 wherein said structure is spaced from said reactor core and said inner tank by two gaps respectively with the width of each gap being smaller than one-twentieth of the height of said structure.

3. In a fast nuclear reactor as set forth in claim 1 wherein said hollow ring is provided internally with at least one horizontal partition wall having a plurality of holes therethrough.

4. In a fast nuclear reactor as set forth in claim 1 wherein sais hollow ring is provided internally with vertical partitions disposed in diametral planes of said ring.

5. In a fast nuclear reactor as set forth in claim 1 wherein said structure is spaced from said reactor core and said inner tank by two gaps respectively with the width of each gap being smaller than one-twentieth of the height of said structure, said hollow ring is provided internally with at least one horizontal partition wall having a plurality of holes therethrough, and said hollow ring is provided internally with vertical partitions disposed in diametral planes of said ring.

* * * * *